United States Patent Office 3,341,531
Patented Sept. 12, 1967

3,341,531
**SUBSTITUTED 7-ACETYLAMINO
CEPHALOSPORANIC ACIDS**
Benjamin Arthur Lewis, Suffern, and Martin Leon Sassiver, Pearl River, N.Y., and Robert Gordon Shepherd, Ridgewood, N.J., assignors to American Cyanamid Company, Stamford, Conn., a corporation of Maine
No Drawing. Filed Feb. 15, 1967, Ser. No. 616,179
10 Claims. (Cl. 260—243)

ABSTRACT OF THE DISCLOSURE

This disclosure describes compounds of the class of 7 - (carboxamidomethylphenylacetylamino)cephalosporanic acids, useful as anti-bacterial agents.

---

This invention relates to new derivatives of 7-aminocephalosporanic acid and, more particularly, is concerned with novel compounds which may be represented by the following general formula:

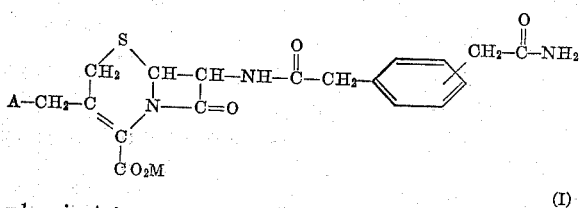

(I)

wherein A is acetoxy or N-pyridinium and M is hydrogen, pharmaceutically acceptable non-toxic cations or an anionic charge when A is N-pyridinium.

DETAILED DESCRIPTION OF THE INVENTION

In the general Formula I set forth above, in those instances where A is N-pyridinium, the cationic charge on this group is matched by the anionic charge of the carboxylic acid radical, the entire molecule being of a zwitterion nature and M is thus an anionic charge. Typical carboxamidomethylphenylacetyl groups contemplated by the present invention are p - (carboxamidomethyl)phenylacetyl, m - (carboxamidomethyl)phenylacetyl and o-(carboxamidomethyl)phenylacetyl.

Also embraced within the scope of the present invention are the non-toxic, pharmaceutically acceptable salts of these derivatives of 7-aminocephalosporanic acid. The cations comprised in these salts and embraced by M include, for example, the non-toxic metal cations such as the sodium ion, potassium ion, calcium ion, magnesium ion, as well as the organic amine cations, such as the tri(lower alkyl)amine cations (e.g. triethylamine) procaine, and the like.

The novel compounds of the present invention, when A is acetoxy in Formula I above, may be readily prepared by acylating 7-aminocephalosporanic acid with a compound of the formula:

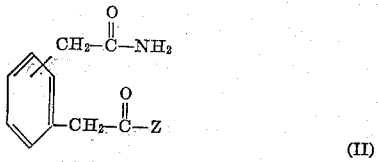

(II)

wherein Z is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C.–5° C., and over a period of time of a few hours or more.

The acylating agents corresponding to the Formula II, when new, may be prepared by methods well known in the art from the corresponding acids (Z is hydroxy). Thus, the acid can be treated with thionyl chloride or oxalyl chloride, if desired in the presence of dimethylformamide, to yield the corresponding acyl chlorides (Z is chlorine), which, if desired, can be converted to the acyl azides (Z is $N_3$) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York, N.Y.). Specific acylating agents operable in this process include, for example, p-(carboxamidomethyl)phenylacetyl chloride, m-(carboxamidomethyl)phenylacetyl azide, p - nitrophenyl o-(carboxamidomethyl)phenylacetate, and the like.

The novel compounds of the present invention, when A is N-pyridinium in Formula I above, may be readily prepared from the corresponding 7-aminocephalosporanic acid derivatives (A is acetoxy in Formula I above) by treatment with pyridine in water or aqueous acetone at 20°–50° C. and for a period of time of about 1–3 days. The resulting 3-(1-pyridylmethyl)-3-cephem - 4 - carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have broad-spectrum antimicrobial activity in vitro against standard laboratory microorganisms used to screen for activity against pathogens. The antibacterial spectrum of a typical compound of the present invention, representing the concentration required to inhibit the growth of various typical bacteria, was determined in a standard manner by the agar-dilution streak-plate technique which is commonly used in testing new antibiotics. The following table summarizes the in vitro activity of 7 - [p - (carboxamidomethyl)phenylacetylamino]cephalosporanic acid (1) as compared with Cephalosporin C (2) against a variety of disease-causing microorganisms.

| Organism | Minimal inhibitory conc. (mcg./ml.) | |
|---|---|---|
|  | (1) | (2) |
| Staphylococcus aureus No. 11 | 3.12 | 100 |
| Staphylococcus aureus ATCC 13709 | 0.78 | 50 |
| Streptococcus pyogenes C–203 | 0.2 | 25 |
| Bacillus cereus ATCC 10702 | 0.78 | 100 |
| Salmonella syphosa ATCC 6539 | 1.56 | 12.5 |
| Proteus mirabilis ATCC 9921 | 3.12 | 25 |
| Escherichia coli ATCC 9637 | 25 | 50 |
| Klebsiella pneumoniae KAD | 1.56 | 25 |
| Shigella shiga | 3.12 | 25 |
| Aerobacter aerogenes | 25 | >100 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

*Example 1.—Preparation of 7-[p-(carboxamidomethyl) phenylacetylamino]cephalosporanic acid* p-(Carboxamidomethyl)phenylacetic acid (386 mg., 2 mmoles) is converted to its acid chloride with oxalyl chloride. The acid chloride in acetone (20 ml.) is added to a stirred solution of 7-aminocephalosporanic acid (545 mg., 2 mmoles) and sodium bicarbonate (504 mg., 6 mmoles) in water (40 ml.) and acetone (20 ml.) which is kept between 0° C. and 5° C. The reaction is stirred for 2 hours at this temperature, and then the acetone is removed under reduced pressure. The aqueous solution is acidified to pH 1 with hydrochloric acid and the mixture extracted with ethyl acetate (3× 50 ml.), the ethyl acetate solution is washed with water (100 ml.) and dried over magnesium sulfate. Evaporation of the solvent under reduced pressure gives 384 mg. of 7-[p-(carboxamidomethyl)phenylacetylamino]cephalosporanic acid. The sodium salt is obtained by slurrying this product in water (10 ml.) and adding 2 N sodium hydroxide dropwise to pH 5 to effect solution. The solution is concentrated to small volume in a rotary evaporator at 50° C. and the sodium salt is precipitated by the addition of acetone. The precipitate is collected by filtration and dried to give 370 mg. of sodium 7-[p-(carboxamidomethyl) phenylacetylamino]cephalosporanate as an ivory solid.

*Example 2.—Preparation of 7-[m-(carboxamidomethyl) phenylacetylamino]cephalosporanic acid*

The procedure of Example 1 is repeated, substituting an equimolecular amount of m-(carboxaminomethyl phenylacetic acid for the p-(carboxamidomethyl)phenylacetic acid employed in that example. There is thus obtained the 7-[m-(carboxamidomethyl)phenylacetylamino]cephalosporanic acid.

*Example 3.—Preparation of 7-[o-(carboxamidomethyl) phenylacetylamino]-3-(1-pyridylmethyl) - 3 - cephem-4-carboxylic acid betaine*

One gram of the sodium salt of 7-[o-(carboxamidomethyl)phenylacetylamino]cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give the product.

*Example 4.—Preparation of p-(carbomethoxymethyl) phenylacetic acid*

A hot solution of sodium hydroxide (9.4 g.) in water (20 ml.) was added all at once to a hot stirred solution of p-phenylenediacetic acid dimethyl ester (52 g.) in methanol (200 ml.). After cooling, the solution was diluted with water (1 l.) and extracted with diethyl ether (3× 200 ml.) to remove unreacted diester. The aqueous layer was acidified with 6 N sulfuric acid and extracted with ethyl acetate (3× 300 ml.). The combined extracts were dried over anhydrous magnesium sulfate and evaporated under reduced pressure. The residue was extracted with boiling heptane to give white plates, 9.68 g., M.P. 91.5°–92° C.

*Example 5.—Preparation of p-(carboxamidomethyl) phenylacetic acid*

A solution of p-(carbomethoxymethyl)phenylacetic acid, 1.04 g. (0.005 mole) in ammonium hydroxide (10 ml.) was kept at room temperature for 2 days. The solution was evaporated under reduced pressure. The residue was dissolved in water (10 ml.) and the solution acidified with 2 N hydrochloric acid to give the product as a white crystalline solid, 0.63 g., M.P. 236°–238° C.

The m-(carboxamidomethyl)phenylacetic acid and o-(carboxamidomethyl)phenylacetic acid may be prepared in like manner by following the procedures of Examples 4 and 5 and employing m-phenylenediacetic acid dimethyl ester and o-phenylenediacetic acid dimethyl ester, respectively, as starting materials.

What is claimed is:
1. A compound of the formula:

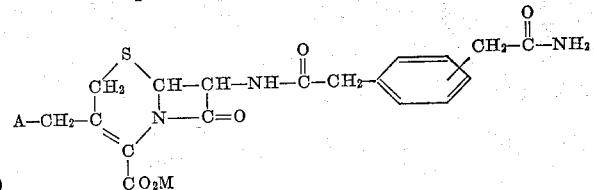

wherein A is selected from the group consisting of acetoxy and N-pyridinium; and M is selected from the group consisting of hydrogen, pharmaceutically acceptable non-toxic cations and an anionic charge when A is N-pyridinium.

2. A compound according to claim 1 wherein A is acetoxy, M is hydrogen, and the carboxamidomethyl group is in the para-position.

3. A compound according to claim 1 wherein A is acetoxy, M is hydrogen, and the carboxamidomethyl group is in the meta-position.

4. A compound according to claim 1 wherein A is acetoxy, M is hydrogen, and the carboxamidomethyl group is in the ortho-position.

5. A compound according to claim 1 wherein A is acetoxy, M is sodium ion, and the carboxamidomethyl group is in the para-position.

6. A compound according to claim 1 wherein A is acetoxy, M is potassium ion, and the carboxamidomethyl group is in the meta-position.

7. A compound according to claim 1 wherein A is acetoxy, M is sodium ion, and the carboxamidomethyl group is in the ortho-position.

8. A compound according to claim 1 wherein A is N-pyridinium, M is an anionic charge, and the carboxamidomethyl group is in the para-position.

9. A compound according to claim 1 wherein A is N-pyridinium, M is an anionic charge, and the carboxamidomethyl group is in the meta-position.

10. A compound according to claim 1 wherein A is N-pyridinium, M is an anionic charge, and the carboxamidomethyl group is in the ortho-position.

References Cited

UNITED STATES PATENTS 3,225,038  12/1965  Flynn.

NICHOLAS S. RIZZO, *Primary Examiner.*